United States Patent [19]
Sieving et al.

[11] 4,109,963
[45] Aug. 29, 1978

[54] DUMP BODY GATE LATCH CONTROL SYSTEM

[75] Inventors: Alfred W. Sieving, Venedy; James M. Stanley, Oreana, both of Ill.

[73] Assignee: Caterpillar Tractor Co., Peoria, Ill.

[21] Appl. No.: 782,669

[22] Filed: Mar. 30, 1977

[51] Int. Cl.² .............................................. B60P 1/00
[52] U.S. Cl. ................................. 298/23 M; 105/276; 105/308 P
[58] Field of Search ............ 298/23 M, 23 R, 23 MD, 298/23 S; 105/308 P, 276

[56] References Cited

U.S. PATENT DOCUMENTS

| 1,961,193 | 6/1934 | Brumbaugh | 298/23 MD X |
| 3,235,310 | 2/1966 | Medley | 298/23 |
| 3,254,919 | 6/1966 | Birchmeier | 298/23 |
| 3,322,464 | 5/1967 | Merritt | 298/23 |
| 3,941,260 | 3/1966 | Fisher | 214/82 |
| 3,958,829 | 5/1976 | Brown | 298/23 B |

Primary Examiner—Albert J. Makay
Assistant Examiner—George F. Abraham
Attorney, Agent, or Firm—James R. Bell

[57] ABSTRACT

A gate latch control system for dump body vehicles includes a hoist control member positionable between lower, hold and raise positions, a hoist lock member, a latch position sensor and a gate latch member positionable between latch and unlatch positions. The hoist lock member is connected to maintain the hoist control member against movement to the raise position when the sensor senses the gate latch member in the latch position and to permit movement of the hoist control member to the raise position when the latch position sensor senses the gate latch member in the unlatch position.

12 Claims, 2 Drawing Figures

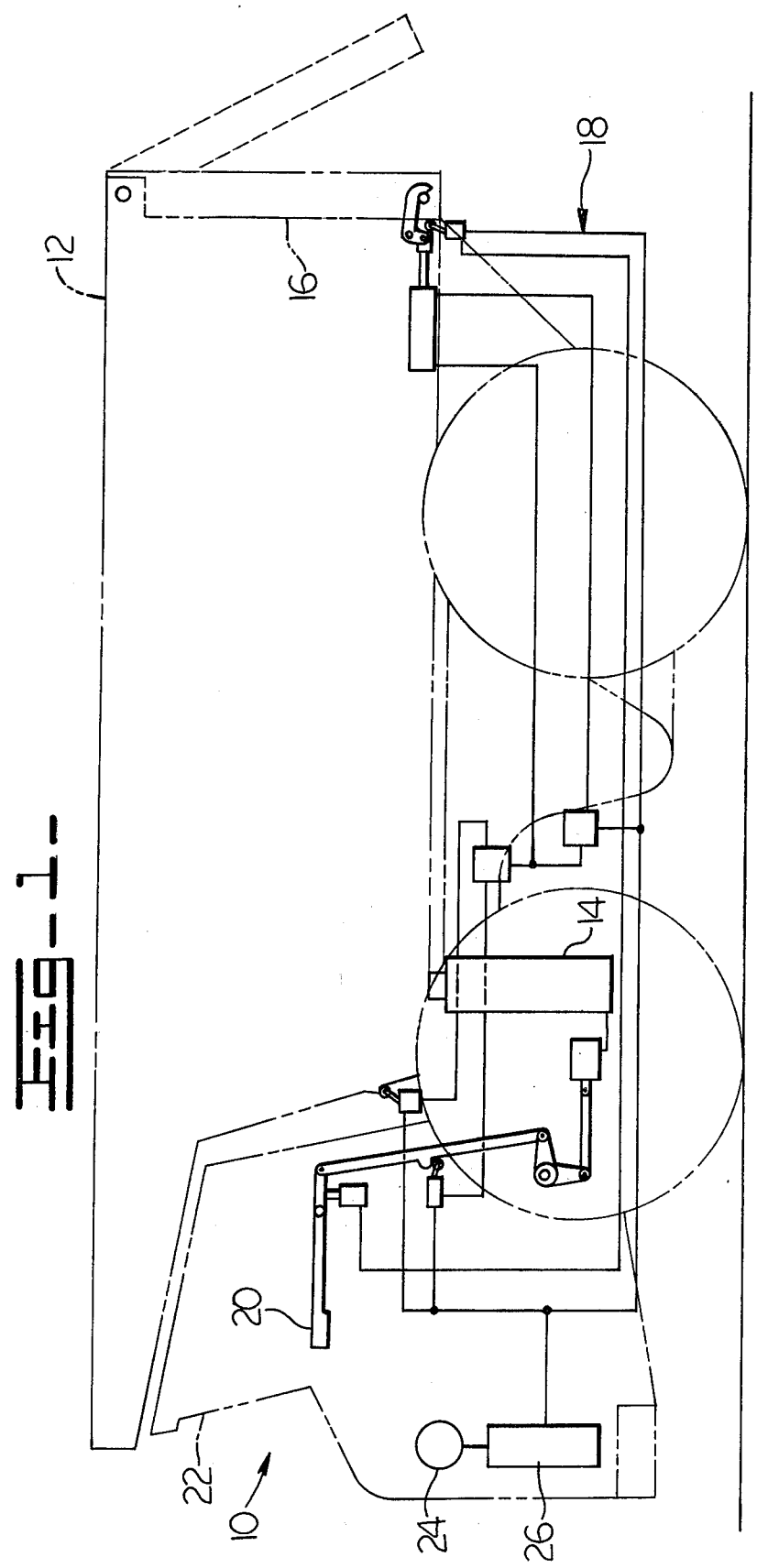

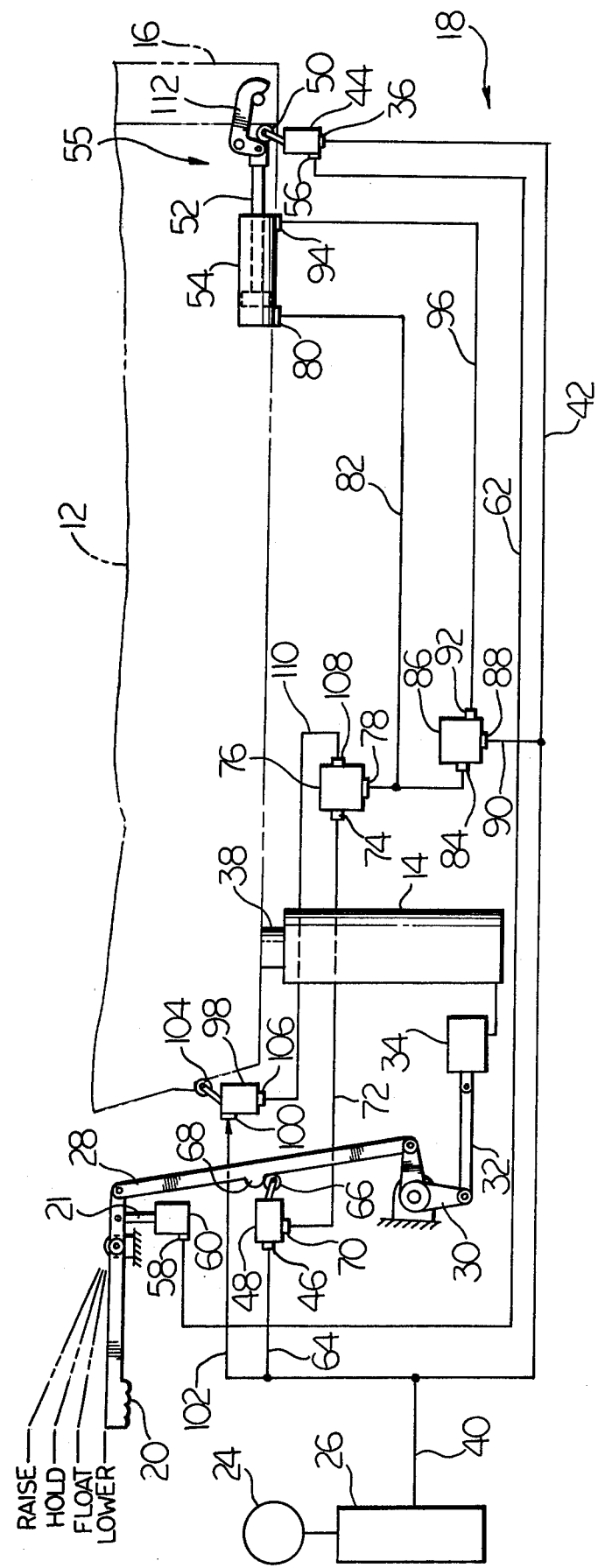

DUMP BODY GATE LATCH CONTROL SYSTEM

BACKGROUND OF THE DISCLOSURE

1. Field of the Invention

This invention relates generally to land vehicles of the dumping type and more particularly to those having an endgate control.

2. Description of the Prior Art

In the past, some known gate latching systems for dump body vehicles generally have been controlled by a linkage and lever arrangement or an actuator controlled by the vehicle operator. These latching systems have been manually operated to unlatch the tailgate or sidegate prior to raising the body to dump a load. If the operator neglects to unlatch the gate prior to actuating the body lift mechanism, a potentially dangerous situation is created. For example, in tailgate-type vehicles, the load could shift rearwardly toward the tailgate as the body raises, and, since the tailgate end of the body overhangs the rear wheels of the vehicle chassis, the vehicle could possibly tip over backwards.

Other known systems provide for automatic gate unlatching. However, these systems provide for unlatching when or as the body is raised. Thus, a malfunction of the latch mechanism could create a potentially dangerous situation. It would be of benefit to have a system with automatic gate unlatching which prohibits raising of the dump body until after the gate is unlatched.

SUMMARY OF THE INVENTION

The present invention is directed to overcoming one or more of the problems as set forth above.

According to the present invention, a gate latch control system is provided for dump body vehicles which requires the gate to be unlatched before the dump body can be raised. This is accomplished by providing the system with a gate latch control assembly movable between a latched position and an unlatched position. A latch position sensor senses the position of the gate latch control assembly. A hoist control is movable between lower, hold and raise positions. A hoist lock maintains the hoist control against movement to the raise position when the sensor senses the gate latch control at the latched position and frees the hoist control for movement to the raise position when the sensor senses the gate latch control at the unlatched position.

The above and further novel features of the invention will appear more fully from the following detailed description when the same is read in conjunction with the accompanying drawings. It is to be expressly understood, however, that the drawings are not intended as a definition of the invention but are for the purpose of illustration only.

BRIEF DESCRIPTION OF THE DRAWINGS

FIG. 1 is a diagrammatic illustration of the gate latch control system of this invention operably mounted on an associated dump body vehicle; and FIG. 2 is a schematic illustration of the gate latch control system of this invention with the components shown diagrammatically.

DESCRIPTION OF THE PREFERRED EMBODIMENT

Referring now to the drawings, a vehicle 10, FIG. 1, having a dump body 12 movable by a lift member 14 includes a tailgate 16 pivotable on the body 12 between open and closed positions. A gate latch control system generally designated 18 is operably connected to control latching and unlatching of tailgate 16. A hoist control lever 20, usually mounted at the vehicle operator's station such as cab 22 controls raising and lowering of dump body 12 in connection with sensing or monitoring the latched or unlatched condition of tailgate 16. A source of pressurized fluid is generally carried by such vehicles as is well known and usually includes a compressor 24 and at least one pressurized fluid containing reservoir 26.

In FIG. 2, system 18 is shown schematically coupled to components of vehicle 10. Compressor 24 operates to supply and maintain fluid in one or more reservoirs 26 at a preselected pressure. The fluid, such as air, is generally used to operate vehicle brakes and the like. In lift or dump body vehicles such as 10, the pressurized air can be used in conjunction with linkages to actuate hydraulic members for raising and lowering dump bodies.

Hoist control lever 20 is conveniently located in cab 22 and fixedly mounted for pivoting between various positions for actuating the raising or lowering of dump body 12. Commonly known positions for such hoist levers are the "lower" position wherein the body is actuated to move downwardly under power, the "float" position wherein the body is permitted to move downwardly under its own weight, the "hold" position which actuates the body to remain in its instant position and the "raise" position which actuates the body to move upwardly under power. The float and hold positions are intermediate to the lower and raise positions.

Lever 20 is connected by linkages 28, 30 and 32 to actuate a hydraulic hoist valve 34 which in turn actuates hydraulic lift cylinder 14 to raise or lower dump body 12 due to the extending or retracting of a rod 38, as is well known.

A suitable pressurized fluid conduit is used to interconnect reservoir 26 with various fluid pressure responsive valves of system 18.

Latch position sensing valve 44 is connected to reservoir 26 via conduits 40, 42 for receiving pressurized fluid at port 36. Valve 44 is a commercially available item such as, for example, a control valve manufactured by the Bendix Corporation and designated Heavy Vehicle Systems Group Part Number 288276 with lever number 245047. Valve 44 is spring loaded in the open position and remains open as long as lever 50 senses rod 52 of fluid pressure responsive latch control member 54 in the latch position. Thus, when gate 16 is latched, pressurized fluid communicates from port 56 of valve 44 to port 58 of fluid pressure responsive hoist lock actuator 60 via conduit 62. When lever 50 senses rod 52 of latch control member 54 in the unlatch position, lever 50 moves to close the valve so that fluid is no longer communicated from valve 44 to actuator 60.

Hoist control member or lock actuator 60 is a commercially available fluid pressure responsive member such as, for example, a rotochamber manufactured by the Bendix Corporation and designated Heavy Vehicle Systems Group Part Number 282047. Actuator 60 is operably connected to lever 20. Pressurized fluid entering actuator 60 at port 58 bears directly against lever 20 via rod 21 to pressure lock lever 20 out of the raise position when normal manual pressure is applied to the lever, but does permit movement of the lever between the lower, float and hold positions.

A gate unlatch valve 48 is connected to receive pressurized fluid at port 46 from reservoir 26 via branch conduit 64. Valve 48 is a similar valve to latch position sensing valve 44 but is spring loaded in the closed position. However, lever 66 is positioned to engage cam 68 on linkage 28 so that movement of lever 20 to the hold position opens valve 48 to communicate pressurized fluid via port 70 and conduit 72 to port 74 of two-way check valve 76.

Two-way check valve 76 is a commercially available fluid pressure responsive member such as, for example, a check valve manufactured by the Bendix Corporation and designated Heavy Vehicle Systems Group Part Number 278615. Pressurized fluid entering valve 76 at port 74 exits via port 78 and is communicated to port 80 of latch control member 54 via conduit 82 and also to port 84 of inversion valve 86.

Inversion valve 86 is a commercially available fluid pressure responsive member such as, for example, a valve manufactured by the Bendix Corporation and designated Heavy Vehicle Systems Group Part Number 281053. Valve 86 receives pressurized fluid at port 88 from reservoir 26 via branch conduit 90. Normally, the pressurized fluid flows through valve 86 and exits through port 92 to be communicated to port 94 of latch control cylinder or actuator 54 via conduit 96.

Gate latch control assembly 55 includes gate latch control actuator 54 having rod 52 slidably extending therefrom and pivotally connected to latch 112. The latch 112 is mounted on dump body 12 for pivoting between a latch position wherein gate 16 is maintained closed and an unlatch position wherein gate 16 is freed to open. Gate latch control actuator 54 is a commercially available fluid pressure responsive member such as any well known double-acting air cylinder. Port 94 adjacent the first end normally receives pressurized fluid from the reservoir via valve 86, and port 80, adjacent the second end only receives pressurized fluid via check valve 76 under preselected conditions such as when check valve 76 receives pressurized fluid from either unlatch valve 48 or from dump body position sensing valve 98. Rod 52 extends from or retracts into actuator 54 between unlatch and latch positions upon application of pressurized fluid to either of ports 80 or 94, respectively, for operating latch 112 to either unlatch or latch tailgate 16.

Dump body position sensing valve 98 is a commercially available fluid pressure responsive valve similar to latch position sensing valve 44 and gate unlatch valve 48 and like valve 48 is spring loaded in the open position but is maintained closed as long as dump body 12 engages lever 104. Valve 98 receives pressurized fluid at port 100 from reservoir 26 via branch conduit 102. Lever 104 is provided to engage dump body 12 when the dump body is lowered. When the dump body is raised, lever 104 permits valve 98 to open and pressurized fluid communicates through valve 98 and exits via port 106 to port 108 of two-way check valve 76 via branch conduit 110.

If preferred, quick release valves can be added to preselected conduits in the system to permit more rapid exhaust of fluid.

Operation

With the parts connected as described above and with vehicle body 12 lowered and hoist control lever 20 in the lower or float position, pressurized fluid in reservoir 26 communicates through normally open latch position sensing valve 44 to hoist lock actuator 60. Pressurized fluid also flows through inversion valve 86 to first end port 94 to maintain rod 52 retracted for latching tailgate 16. Pressurized fluid also flows to port 46 of normally closed unlatch valve 48 and at port 100 of closed dump body position sensing valve 98. Hoist lock actuator 60, when receiving pressurized fluid maintains lever 20 out of the raise position.

Lever 20 may be moved to the hold position causing cam 68 to open unlatch valve 48 permitting pressurized fluid to act through check valve 76 to second end port 80 of latch control actuator 54 and to inversion valve 86. The pressurized fluid acts to close inversion valve 86 to interrupt the flow of pressurized fluid to port 94 of latch control actuator 54 and thus the pressurized fluid simultaneously acting at port 80 of latch control actuator 54 urges rod 52 out of actuator 54 for unlatching tailgate 16.

When rod 52 moves to unlatch tailgate 16, lever 50 moves to close further fluid communication through valve 44 to actuator 60. This permits movement of lever 20 to the raise position. Body 12 now leaves the vehicle frame and travels upward permitting lever 104 of valve 98 to move opening fluid communication to port 108 of two-way check valve 76. Pressurized fluid from valve 48 acting on port 74 of valve 76 and pressurized fluid from valve 98 acting on port 108 of valve 76 provide separate inputs for valve 76 to select from and thus permit valve 76 to communicate the selected input to port 80 of actuator 54 and also to port 84 of valve 86.

When lever 20 is returned to the lower or float position, cam 68 disengages lever 66 thus closing fluid communication through valve 48. However, input is still available at port 108 of valve 76 to maintain pressurized fluid at port 80 of actuator 54 and for continuing to interrupt pressurized fluid acting at port 94 of actuator 54. Once body 12 seats and engages lever 104, fluid communication to valve 76 is interrupted. Tailgate 16 pivots closed due to gravity. Pressure is relieved at port 80 of actuator 54 and pressure is resumed at port 94 of actuator 54 thus retracting rod 52 to the latch position. The latch position of rod 52 is sensed by lever 50 of valve 44 which is now opened to resume communication of pressurized fluid to lock actuator 60.

The foregoing has described an automatic gate latch system for dump body vehicles which prohibits raising the dump body until after the gate is unlatched.

The embodiments of the invention in which an exclusive property or privilege is claimed are defined as follows:

1. A gate latch control system comprising:
   a gate latch control assembly controllably connectable to an associated movable dump body gate, said latch control assembly being movable between a latched position at which said associated gate is maintainable at a closed position and an unlatched position at which said gate is freed to move to an open position;
   latch position sensing means for sensing the position of the gate latch control assembly;
   hoist control means movable between lower, hold and raise positions; and
   hoist lock means for maintaining the hoist control means against movement to the raise position in response to the latch position sensing means sensing the gate latch control assembly at the latched position and for freeing the hoist control means for movement to the raise position in response to the latch position sensing means sensing the gate latch control assembly at the unlatched position.

2. The system of claim 1, further comprising:
gate unlatch means for initiating movement of the gate latch control assembly to the unlatched position in response to the hoist control means being at the hold position.

3. The system of claim 2, further comprising:
a vehicle body having a movable dump body connected to the gate latch control system, said vehicle body being movable between a generally horizontal position and a tilted position in response to movement of the hoist control means and said dump body gate being movable between an open and a closed position; and
dump body position sensing means connected for sensing the position of the vehicle body and maintaining the gate latch control assembly at the unlatched position in response to said dump body being at the tilted position.

4. A gate latch control system comprising:
a gate latch control assembly controllably connectable to an associated movable dump body gate, said latch control assembly being movable between a latched position at which said associated gate is maintainable at a closed position and an unlatched position at which said gate is freed to move to an open position;
latch position sensing means for sensing the position of the gate latch control assembly;
hoist control means movable between lower, hold and raise positions;
hoist lock means for maintaining the hoist control means against movement to the raise position in response to the latch position sensing means sensing the gate latch control assembly at the latched position and for freeing the hoist control means for movement to the raise position in response to the latch position sensing means sensing the gate latch control assembly at the unlatched position;
gate unlatch means for initiating movement of the gate latch control assembly to the unlatched position in response to the hoist control means being at the hold position;
a vehicle body having a movable dump body connected to the gate latch control system, said vehicle body being movable between a generally horizontal position and a tilted position in response to movement of the hoist control means and said dump body gate being movable between an open and a closed position;
dump body position sensing means connected for sensing the position of the vehicle body and maintaining the gate latch control assembly at the unlatched position in response to said dump body being at the tilted position; and
inversion valve means operably connected for maintaining the gate latch control assembly at the unlatched position in response to the hoist control means being at the hold position.

5. The system of claim 4, further comprising:
the inversion valve means also operably connected for maintaining the gate latch control assembly at the unlatched position in response to the dump body being at the tilted position.

6. The system of claim 4 further comprising:
two-way check valve means for selectively interconnecting the inversion valve means with either of the gate unlatch means and the dump body position sensing means.

7. In a vehicle including a gate latch control assembly controllably connectable to an associated movable dump body gate, said latch control assembly being movable between a latched position at which said associated gate is maintainable at a closed position and an unlatched position at which said gate is freed to move to an open position and hoist control means movable between lower, hold and raise positions, the improvement comprising:
latch position sensing means for sensing the position of the gate latch control assembly, and
hoist lock means for maintaining the hoist control means against movement to the raise position in response to the latch position sensing means sensing the gate latch control assembly at the latched position and for freeing the hoist control means for movement to the raise position in response to the latch position sensing means sensing the gate latch control assembly at the unlatched position.

8. The system of claim 7, further comprising:
gate unlatch means for initiating movement of the gate latch control assembly to the unlatched position in response to the hoist control means being at the hold position.

9. The system of claim 8, further comprising:
a vehicle body having a movable dump body connected to the gate latch control system, said vehicle body being movable between a generally horizontal position and a tilted position in response to movement of the hoist control means and said dump body gate being movable between an open and a closed position; and
dump body position sensing means connected for sensing the position of the vehicle body and maintaining the gate latch control assembly at the unlatched position in response to said dump body being at the tilted position.

10. The system of claim 9, further comprising:
inversion valve means operably connected for maintaining the gate latch control assembly at the unlatched position in response to the hoist control means being at the hold position.

11. The system of claim 10, further comprising:
the inversion valve means also operably connected for maintaining the gate latch control assembly at the unlatched position in response to the dump body being at the tilted position.

12. The system of claim 10, further comprising:
two-way check valve means for selectively interconnecting the inversion valve means with either of the gate unlatch means and the dump body position sensing means.

* * * * *